United States Patent
Huang

(10) Patent No.: US 8,013,653 B2
(45) Date of Patent: Sep. 6, 2011

(54) METHOD, SYSTEM AND DEVICE FOR ELIMINATING INTRA-PAIR SKEW

(75) Inventor: Chunxing Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 12/477,546

(22) Filed: Jun. 3, 2009

(65) Prior Publication Data
US 2009/0243682 A1 Oct. 1, 2009

Related U.S. Application Data

(63) Continuation of application No. PCT/CN2008/072844, filed on Oct. 27, 2008.

(30) Foreign Application Priority Data

Oct. 31, 2007 (CN) .......................... 2007 1 0176650

(51) Int. Cl.
*H03K 3/00* (2006.01)
(52) U.S. Cl. ........................................ 327/234; 327/236
(58) Field of Classification Search .................. 327/233, 327/234, 236
See application file for complete search history.

(56) References Cited

U.S. PATENT DOCUMENTS

| | | | |
|---|---|---|---|
| 6,043,717 A | 3/2000 | Kurd | |
| 6,052,007 A * | 4/2000 | Ono | 327/158 |
| 7,085,337 B2 * | 8/2006 | Dyer et al. | 375/354 |
| 7,352,204 B2 * | 4/2008 | Frisch | 326/26 |
| 7,405,598 B2 * | 7/2008 | Goh et al. | 326/86 |
| 7,493,509 B2 * | 2/2009 | Fung et al. | 713/401 |
| 7,538,594 B2 * | 5/2009 | Jia et al. | 327/261 |
| 7,633,313 B2 * | 12/2009 | Goh et al. | 326/86 |
| 2006/0244505 A1 * | 11/2006 | Fung et al. | 327/293 |
| 2006/0256880 A1 * | 11/2006 | Frisch | 375/257 |
| 2007/0121761 A1 * | 5/2007 | Dosho et al. | 375/329 |
| 2009/0153213 A1 * | 6/2009 | Jia et al. | 327/261 |

FOREIGN PATENT DOCUMENTS

CN 1933465 3/2007

OTHER PUBLICATIONS

First Office Action in counterpart Chinese Application No. 200710176650.1, mailed Jul. 16, 2010.
Written Opinion in counterpart PCT Application No. PCT/CN2008/072844, mailed Feb. 12, 2009.
$2^{nd}$ Office Action in corresponding Chinese Application No. 200710176650.1 (Apr. 27, 2011).

* cited by examiner

*Primary Examiner* — Lincoln Donovan
*Assistant Examiner* — Ryan C Jager
(74) *Attorney, Agent, or Firm* — Leydig, Voit & Mayer, Ltd.

(57) ABSTRACT

A method, system and device for eliminating intra-pair skew are disclosed. The method includes: measuring a phase difference between the received differential signals as a transmission delay difference; and compensating delays of the differential signals using the transmission delay difference, to eliminate intra-pair skew of the differential signals. A phase difference measuring apparatus is used to measure a phase difference between the differential signals as the transmission delay difference, so that the transmission delay difference may be adjusted according to the phase difference. Therefore, the procedure for eliminating intra-pair skew is effectively simplified, and the effect of adjusting the transmission delay difference is improved.

4 Claims, 8 Drawing Sheets

METHOD, SYSTEM AND DEVICE FOR ELIMINATING INTRA-PAIR SKEW

CROSS-REFERENCE TO RELATED APPLICATIONS

This application is a continuation of International Application No. PCT/CN2008/072844, filed Oct. 27, 2008, which claims the priority to Chinese patent application No. 200710176650.1, filed Oct. 31, 2007. The contents of each of these applications is incorporated by reference herein its entirety.

FIELD OF THE INVENTION

The present invention relates to electronics technologies, and particularly to a technology of eliminating intra-pair skew.

BACKGROUND OF THE INVENTION

With rapid development of a high speed interconnection technology, the transmission rate of a channel has been higher and higher, and has been up to 10 Gbps so far. A signal at a high transmission rate is typically transmitted in the form of a pair of differential signals consisting of two signals with opposite polarities. One of the two signals with opposite polarities is defined as a positive signal P and the other is defined as a negative signal N. Accordingly, two differential signals are transmitted via two channels. In other words, two paths for signal transmission are required. The negative signal is subtracted from the positive signal at a receiving end to obtain the received signal, on which the processing such as level judging is performed subsequently. That is, the signals are received and processed.

Desirably, the two differential signals with opposite polarities arrive at any point along the channel from a transmitting end to a receiving end simultaneously, also at a decider in a chip at the receiving end simultaneously. Therefore, the differential signals are required to have the same transmission delay to ensure the transmission reliability of the signals. As shown in FIG. 1, the intra-pair skew is required to be 0, so that the optimal received signal can be obtained by subtracting one of the pair of differential signals from the other, as shown in FIG. 2.

In practice, however, because the material characteristic of a circuitry board is anisotropic and differential wirings have different lengths, the transmission delays of two differential signals with opposite polarities may be different during the transmission of the differential signals, thus, the intra-pair skew is not 0.

FIG. 3 is a schematic diagram showing the case where the intra-pair skew is not 0. In this case, the received signal obtained from the pair of differential signals is shown in FIG. 4. The signal obtained after the differential transmission as shown in FIG. 4 is not desirable.

Therefore, a larger intra-pair skew leads to a larger jitter at the receiving end, resulting in a severer error in the optimal sampling point for Clock and Data Recover (CDR), which increases the receiving bit error rate at the receiving end and therefore degrades the system performance. Further, for a signal at a higher rate, any degradation may result in a much higher bit error rate and even a malfunction of the entire system.

Accordingly, a method for eliminating intra-pair skew has been proposed, and in the method, the intra-pair skew is eliminated by compensating differential transmission delays of signals P and N. As shown in FIG. 5, a device for eliminating a delay difference includes delay control modules, delay modules, a subtractor, an error generating circuit and a slicer (i.e. a threshold level decider). In the adaptive compensation of the intra-pair skew, an error component is obtained by subtracting a signal after the slicer from a signal before the slicer and inputted respectively to the delay control modules for signals P and N, each of the delay control modules determines a delay control component according to the error component, and the delay modules determine delay adjustment components for signals P and N according to the delay control components and compensate the intra-pair skew caused by channels.

In the process of implementing the present invention, the inventor discovers that the following problems exist in the prior art. The method for eliminating intra-pair skew in the prior art is disadvantageous in that the intra-pair skew between the signals P and N cannot be measured, as a result, the differential transmission delays cannot be adjusted accurately.

SUMMARY OF THE INVENTION

A method, system and device for eliminating intra-pair skew is provided in embodiments of the present invention, to improve the adjustment of a transmission delay difference.

A system for eliminating intra-pair skew is provided, and the system includes: a phase difference measuring apparatus, adapted to detect phases of differential signals received at a receiving end, to obtain a phase difference between the differential signals as a transmission delay difference; and a delay adjusting apparatus, adapted to adjust a delay of a signal inputted to the delay adjusting apparatus according to the transmission delay difference obtained by the phase difference measuring apparatus, to output the signal after the delay adjustment.

A method for eliminating intra-pair skew is provided, and the method includes: measuring a phase difference between the received differential signals as a transmission delay difference; and compensating delays of the differential signals using the transmission delay difference, to eliminate intra-pair skew of the differential signals.

According to the technical solutions in the present invention, a phase difference between the differential signals is measured as the transmission delay difference, so that the transmission delay difference may be adjusted according to the phase difference. Therefore, according to the embodiments of the present invention, the processing of eliminating intra-pair skew is effectively simplified, and the effect of adjusting the transmission delay difference is improved.

DETAILED DESCRIPTION OF THE EMBODIMENTS

Figure 1:
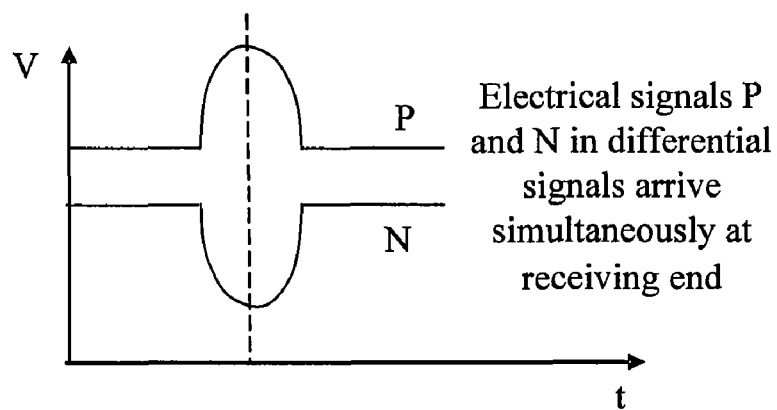
FIG. 1 is a schematic diagram showing the received signals between which no delay difference exists in the prior art.
Figure 2:
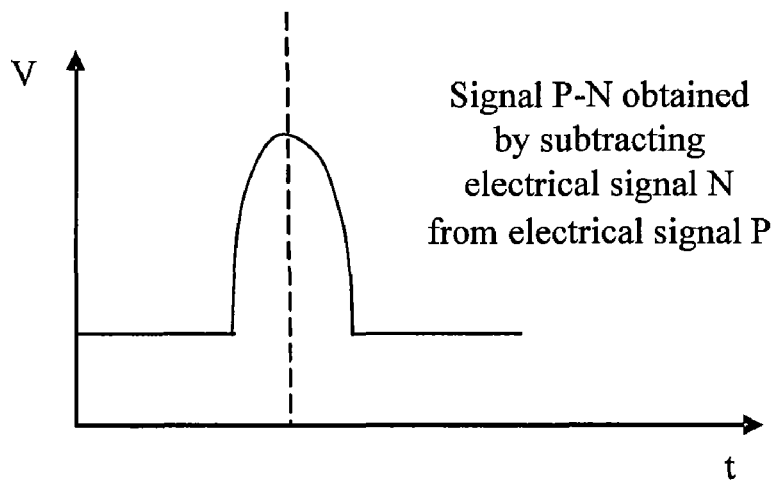
FIG. 2 is a schematic diagram showing a signal obtained by subtracting one of the received signals shown in FIG. 1 from the other.
Figure 3:
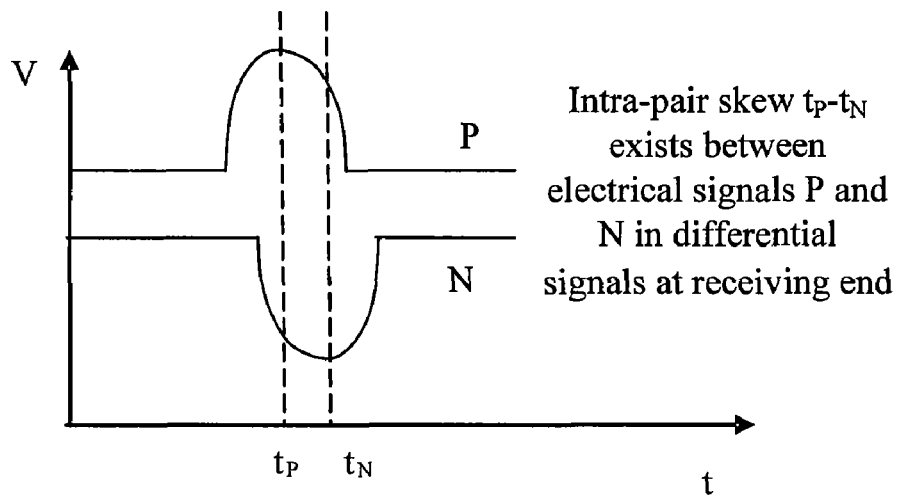
FIG. 3 is a schematic diagram showing the received signals between which a delay difference exists in the prior art.
Figure 4:
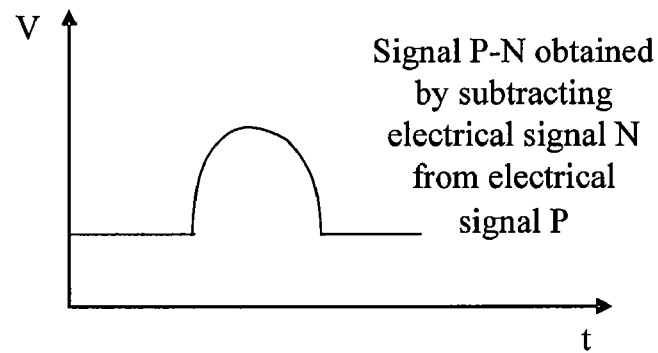
FIG. 4 is a schematic diagram showing a signal obtained by subtracting one of the received signals shown in FIG. 3 from the other.
Figure 5:
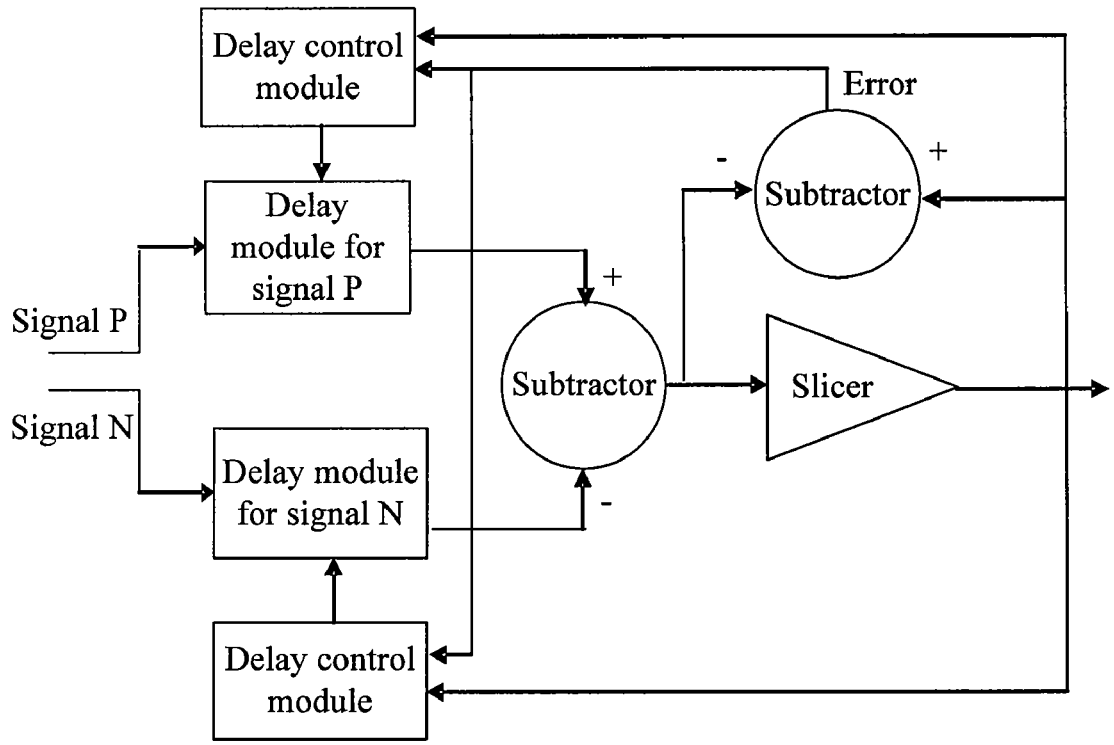
FIG. 5 is a schematic diagram showing a device for eliminating a delay difference in the prior art.

In embodiments of the present invention, eliminating intra-pair skew of the differential signals is implemented by measuring a phase difference between differential signals as a transmission delay difference, and compensating delays of the differential signals using the measured phase difference.

In the embodiment of the present invention, the procedure for compensating the delays of the differential signals includes but is not limited to: obtaining control information, i.e. a digital control signal, according to the transmission delay difference between the differential signals; performing Digital-to-Analog Conversion of the control information to obtaining the converted voltage signal; and adjusting the delays of the inputted differential signals according to the converted voltage signal and outputting the differential signals subjected to the delay adjustment.

The procedure for compensating the delays of the differential signals using the transmission delay difference may include: determining whether to adjust the delay of the electrical signal P or N from the differential signals according to the transmission delay difference, and adjusting the delay of the electrical signal P or N according to the determination result. For example, it is determined to adjust the delay of the electrical signal P if the electrical signal P arrives earlier than the electrical signal N; it is determined to adjust the delay of the electrical signal N if the electrical signal N arrives earlier than the electrical signal P; and no delay adjustment is performed if the electrical signal P and the electrical signal N arrive simultaneously. Optionally, in the case where the electrical signal P and the electrical signal N arrive simultaneously, the delays of the differential signals may be adjusted according to an error in the current differential signals after a predefined period of time, to adjust finely the delay difference of the differential signals and improve the precision of adjusting the differential signals.

During the processing of delay adjustment, if the delay adjustment amount may exceed the delay adjustment capability, it is determined in advance whether the delay adjustment boundary has been reached before the delay adjustment processing, and whether to perform the delay adjustment according to the determination result. Particularly, if it is determined that the delay adjustment boundary has been reached, it is indicated that a delay adjustment step cannot be increased further, and the delay adjustment on the electrical signal P or N may be stopped; otherwise, it is indicated that the delay adjustment boundary has not been reached and the delay adjustment on the electrical signal P or N may be performed further.

Optionally, during the delay adjustment described above, a delay adjustment step for the differential signals may be determined according to the transmission delay difference to satisfy the delay adjustment of various differential signals.

For the better understanding of the present invention, embodiments of the present invention are described in detail below with reference to the accompanying drawings and implementation of the present invention.

A First Embodiment

Figure 6:
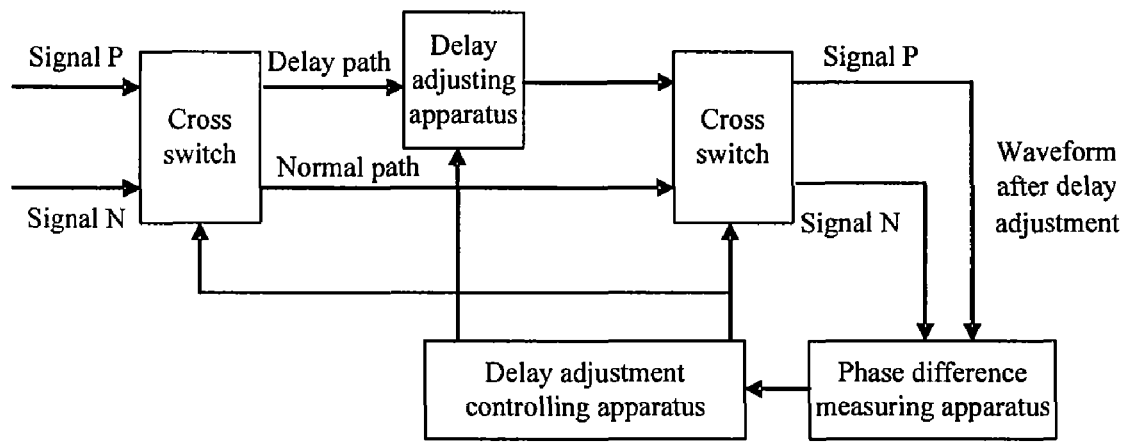
FIG. 6 is a schematic diagram showing structure of a system according to a first embodiment of the present invention.

As shown in FIG. 6, a device for eliminating intra-pair skew according to an embodiment of the present invention may include: cross switches, a delay adjusting apparatus, a phase difference measuring apparatus and a delay adjustment controlling apparatus. A signal P at the receiving end is the positive signal in the received differential signals, and a signal N at the receiving end is the negative signal in the received differential signals.

Functions of the parts shown in FIG. 6 are described below.

(1) A cross switch is adapted to input the selected differential signal into the delay adjusting apparatus according to the transmission delay difference obtained by the phase difference measuring apparatus. Further, another cross switch is adapted to switch the electrical signals P and N between the delay path and the normal path to finish the paths. The operation of both cross switches may enable the system to be at two states.

One of the two states is that the electrical signal P is coupled to the delay path, and the electrical signal N is coupled to the normal path.

The other of the two states is that the electrical signal P is coupled to the normal path, and the electrical signal N is coupled to the delay path.

(2) The phase difference measuring apparatus is adapted to detect phases of the differential signals received at the receiving end to obtain a phase difference between the differential signals as a transmission delay difference. Particularly, the phase difference measuring apparatus is adapted to compare the phase of the electrical signal P with that of the electrical signal N, obtain the phase difference through the comparison as the transmission delay difference, and convert the transmission delay difference into control information, which is sent to the delay adjustment controlling apparatus.

(3) The delay adjusting apparatus is adapted to adjust the delay of the signal inputted therein, i.e. adjusting the delay of the signal inputted to the delay adjusting apparatus according to the transmission delay difference obtained by the phase difference measuring apparatus, and outputting the signal after the delay adjustment.

(4) The delay adjustment controlling apparatus is adapted to control the cross switches and the delay adjusting apparatus according to the transmission delay difference sent by the phase difference measuring apparatus, so that the delays of the electrical signals P and N from the differential signals may be adjusted. Particularly, the delay adjustment controlling apparatus generates the control information according to the transmission delay difference and controls the cross switches and the delay adjusting apparatus using the control information. The delay adjustment controlling apparatus is optional in that the delay adjustment controlling control apparatus may be omitted if the phase measuring apparatus itself controls the delay adjustment of the delay adjusting apparatus using the phase difference.

Figure 9:
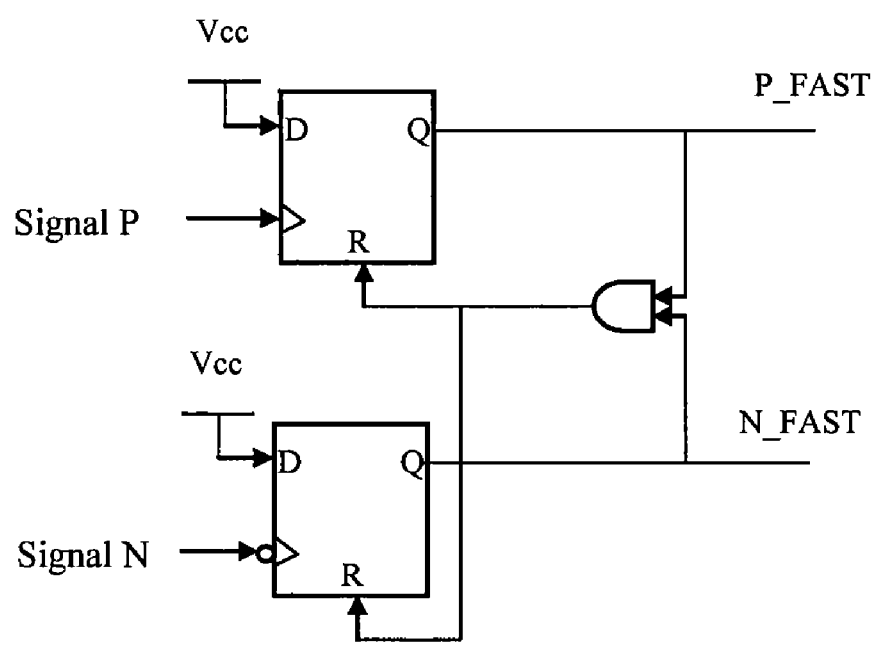
FIG. 9 is a schematic diagram showing structure of a phase difference measuring apparatus according to an embodiment of the present invention.

In the device described above, the phase difference measuring apparatus compares the time point when the electrical signal P arrives with the time point when the electrical signal N arrives, and outputs two electrical signals, i.e. two electrical signals indicating the sequence in which the electrical signals P and N arrive, such as signals P_FAST and N_FAST shown in FIG. 9, to the delay adjustment controlling apparatus in the following cases.

(1) If the electrical signals P and N from the differential signals arrive simultaneously at the receiving end, the time point Tp when the electrical signal P crosses a common-mode level is the same as the time point Tn when the electrical signal N crosses the common-mode level, i.e. Tp=Tn.

(2) If the electrical signal P of the differential signals arrives at the receiving end earlier than the electrical signal N of the differential signals, the time point Tp when the electrical signal P crosses the common-mode level is earlier than the time point Tn when the electrical signal N crosses the common-mode level, i.e. Tp<Tn.

(3) If the electrical signal P of the differential signals arrives at the receiving end later than the electrical signal N of the differential signals, the time point Tp when the electrical signal P crosses the common-mode level is later than the time point Tn when the electrical signal N crosses the common-mode level, i.e. Tp>Tn.

Figure 7:
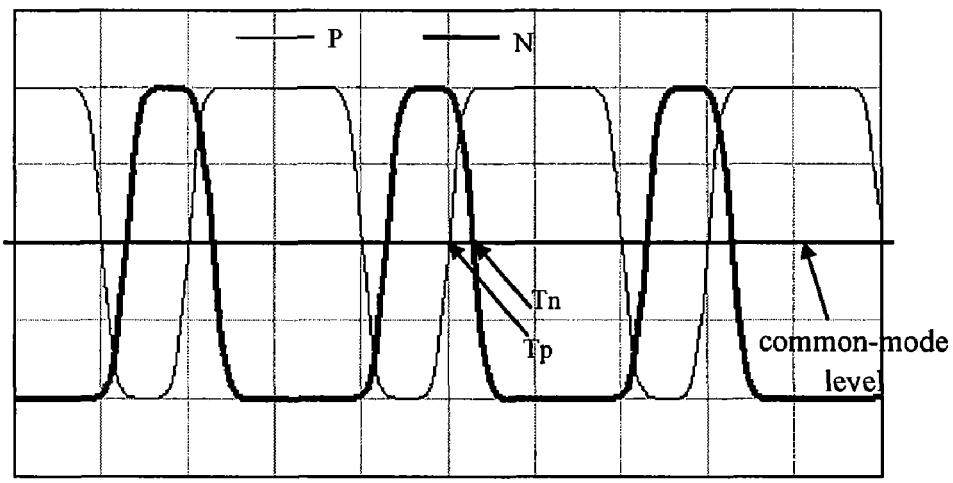
FIG. 7 is a schematic diagram showing a phase difference for Non-Return-to-Zero (NRZ) differential transmission according to an embodiment of the present invention.

As shown in FIG. 7, taking Non-Return-to-Zero (NRZ) differential signals as an example, the time point when the electrical signal P arrives is different from the time point when the electrical signal N arrives, and the time point when the electrical signal P crosses the common-mode level is earlier than the time point when the electrical signal N crosses the common-mode level, so the electrical signal P arrives earlier than the electrical signal N.

Figure 8:
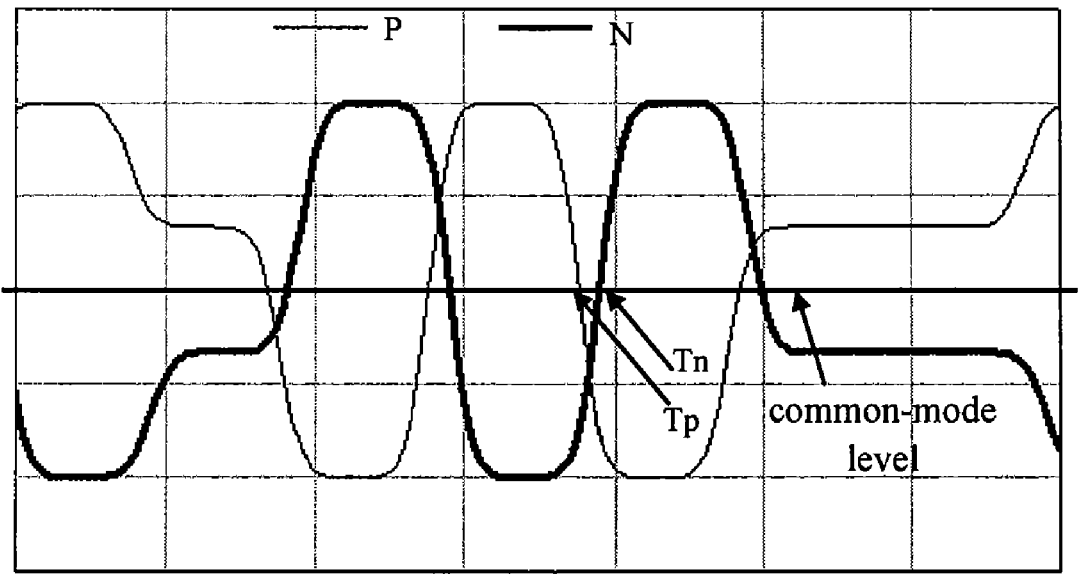
FIG. 8 is a schematic diagram showing a phase difference for four-level Pulse Amplitude Modulation (PAM4) differential transmission according to an embodiment of the present invention.

As shown in FIG. 8, taking PAM4 signals as an example, the time point when the electrical signal P arrives is different from the time point when the electrical signal N arrives, and the time point when the electrical signal P crosses the common-mode level is earlier than the time point when the electrical signal N crosses the common-mode level, so the electrical signal P arrives earlier than the electrical signal N.

As described above, the relationship between the time point when the electrical signal P from the differential signals and the time point when the electrical signal N from the differential signals may be expressed as below:

when Tp=Tn, no delay difference exists between the differential signals;

when Tp<Tn, the electrical signal P arrives earlier than the electrical signal N; and when Tp>Tn, the electrical signal P arrives later than the electrical signal N.

In the embodiment of the present invention, it is required to obtain the sequence information of Tp and Tn. In other words, the phase difference measuring apparatus is used to obtain the time information of Tp and Tn. The phase difference measuring apparatus may be implemented as a circuit as shown in FIG. 9, where a phase difference detecting circuit used as the phase difference measuring apparatus may include: two D flip flops, to which the electrical signals P and N are inputted respectively; and an AND gate connected to both D flip flops. Outputs of the two D flip flops are connected to inputs of the AND gate, an output of the AND gate is connected to RESET terminal of each of the D flip flops, and the control information corresponding to the transmission delay difference (i.e. the phase difference) is outputted from the outputs of the two D flip flops. The phase difference detecting circuit may operate as follows.

When a valid trigger edge is generated in the electrical signal P, an electrical signal P_FAST is outputted from a first D flip flop to which the electrical signal P is inputted. Likewise, when a valid trigger edge is generated in the electrical signal N, an electrical signal N_FAST is outputted from a second D flip flop to which the electrical signal N is inputted. If the electrical signals P_FAST and N_FAST are valid simultaneously, the first and second D flip flops are reset by the AND gate through the RESET terminals, so that the electrical signals P_FAST and N_FAST are reset as 0.

According to the structure and function of the phase difference measuring apparatus described above, if the electrical signal P arrives earlier than the electrical signal N, a valid electrical signal P_FAST is generated and subsequently a valid electrical signal N_FAST is generated when the electrical signal N arrives, after which both electrical signals P_FAST and N_FAST are reset as 0 soon, and therefore, the phase difference detecting circuit detects the electrical signal P_FAST only and ignores the electrical signal N_FAST as a spike. If the electrical signal N arrives earlier than the electrical signal P, a valid electrical signal N_FAST is generated and subsequently a valid electrical signal P_FAST is generated when the electrical signal P arrives, after which both electrical signals P_FAST and N_FAST are reset as 0 soon, and therefore, the phase difference detecting circuit detects the electrical signal N_FAST only and ignores the electrical signal P_FAST as a spike. If the electrical signals N and P arrive simultaneously, the electrical signals N_FAST and P_FAST are generated simultaneously, and the electrical signals P_FAST and N_FAST are reset as 0 by the AND gate, so the phase difference detecting circuit detects no valid electrical signal.

According to the phase difference detecting circuit described above, the timing states of the phase difference detecting circuit may be described in the following cases:

(1) when Tp=Tn, no delay difference exists between the differential signals (including the electrical signals P and N), P_FAST=0 and N_FAST=0;

(2) when Tp<Tn, the electrical signal P arrives earlier than the electrical signal N, P_FAST=1 and N_FAST=0; and (3) when Tp>Tn, the electrical signal P arrives later than the electrical signal N, P_FAST=0 and N_FAST=1.

Figure 10:
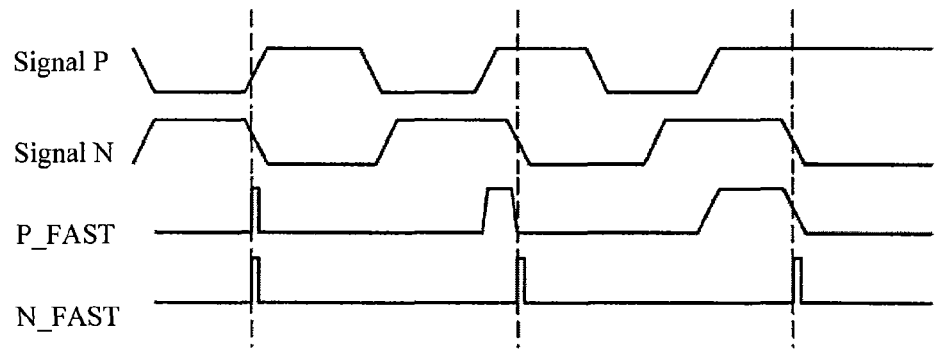
FIG. 10 is a timing diagram of signals P and N according to an embodiment of the present invention.

FIG. 10 is a diagram showing the timing of the electrical signals P and N in the case where the electrical signal P arrives earlier than the electrical signal N. The timing of the electrical signals P and N in the other cases, for example, where the electrical signal P arrives later than the electrical signal N, is similar to that in the above case and description thereof is omitted herein.

Figure 11:
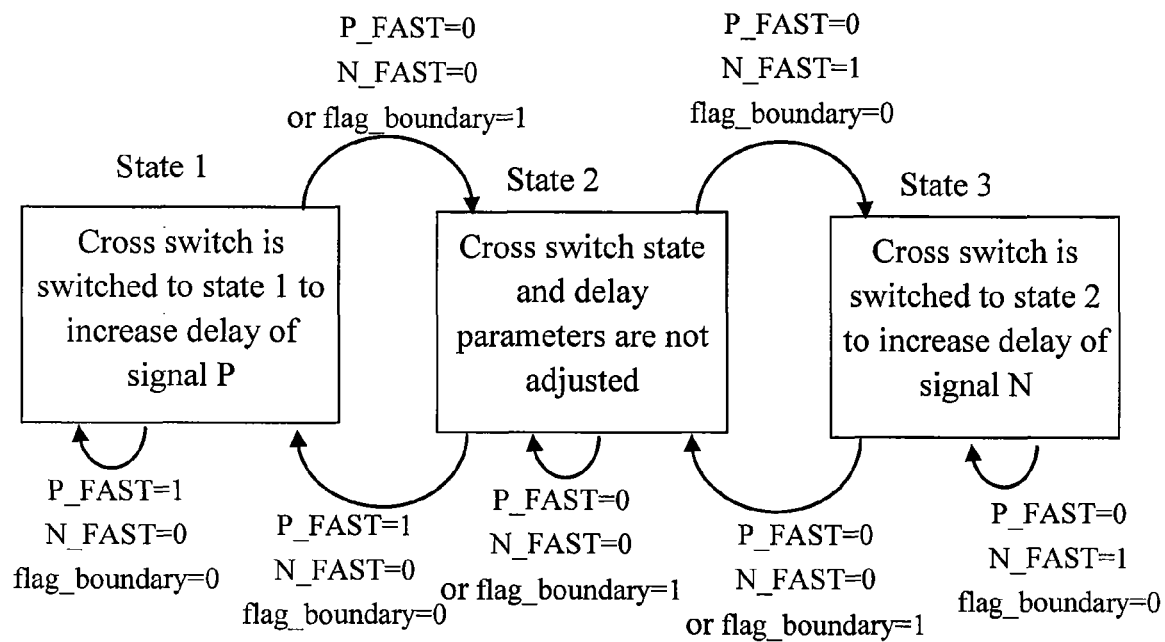
FIG. 11 is a schematic diagram illustrating state transition of a delay adjustment controlling apparatus according to the first embodiment of the present invention.

According to the timing relationship between the electrical signals P and N, functions of the delay adjustment controlling apparatus (which is also referred to as a controller) may be implemented using a state machine. As shown in FIG. 11, the state transition of the controller includes the following.

(1) Upon the reset or power-on of the system, the controller is at a second state (i.e. state 2), and a boundary flag flag_boundary, which indicates whether the delay adjustment boundary is reached in the delay adjustment apparatus during the delay adjustment, is set as 0.

When the controller is at the second state, the transition between different states according to the signal received from the phase difference measuring apparatus includes the following.

If the signal received from the phase difference measuring apparatus is that P_FAST=0, N_FAST=0, or flag_boundary=1, the controller is maintained at the second state. In other words, the delay parameter and cross switch states are not adjusted.

If the signal received from the phase difference measuring apparatus is that P_FAST=1 and N_FAST=0, the controller moves to a first state (i.e. state 1), and the electrical signal P is switched to the delay adjusting apparatus in the delay path via the cross switches to increase delay of the signal P.

If the signal received from the phase difference measuring apparatus is that P_FAST=0 and N_FAST=1, the controller moves to a third state (i.e. state 3), and the electrical signal N is switched to the delay adjusting apparatus in the delay path via the cross switches to increase delay of the signal N.

(2) When the controller is at the first state, the transition between different states according to the signal received from the phase difference measuring apparatus includes the following.

If the signal received from the phase difference measuring apparatus is that P_FAST=1 and N_FAST=0, the controller is maintained at the first state, and the electrical signal P is switched to the delay adjusting apparatus in the delay path via the cross switches to increase delay of the signal P.

If the signal received from the phase difference measuring apparatus is that P_FAST=0, N_FAST=0, the controller moves to the second state, and the delay parameter and cross switch states are not adjusted.

If the delay adjustment boundary is reached in the delay adjusting apparatus, the controller returns to the second state. In other words, the delay parameter of the differential signals is not further adjusted and the flag_boundary is set as 1.

(3) When the controller is at the third state, the transition between different states according to the signal received from the phase difference measuring apparatus includes the following.

If the signal received from the phase difference measuring apparatus is that P_FAST=0 and N_FAST=1, the controller is maintained at the third state, and the electrical signal N is switched to the delay adjusting apparatus in the delay path via the cross switches to increase delay of the signal N.

If the signal received from the phase difference measuring apparatus is that P_FAST=0, N_FAST=0, the controller moves to the second state, and the delay parameter and cross switch states are not adjusted.

If the delay adjustment boundary is reached in the delay adjusting apparatus, the controller returns to the second state. In other words, the delay parameter of the differential signals is not further adjusted and the flag_boundary is set as 1.

It is noted that the determination of whether the delay adjusting apparatus reaches the delay adjustment boundary is optional. In other words, the flag_boundary may be omitted. For example, the flag_boundary may be omitted if the delay adjustment apparatus has a sufficient adjustment capability.

Figure 12A:
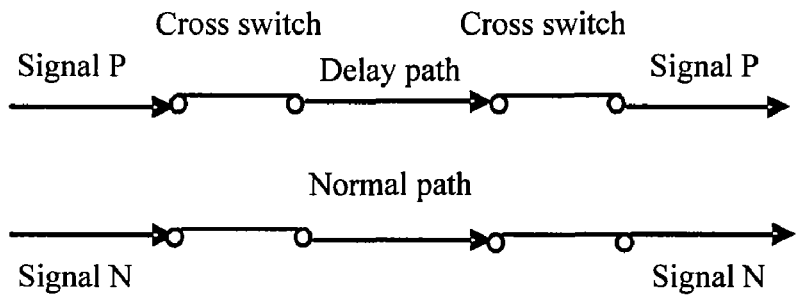
FIGS. 12A and 12B are schematic diagrams showing states of cross-switches according to an embodiment of the present invention.
Figure 12B:
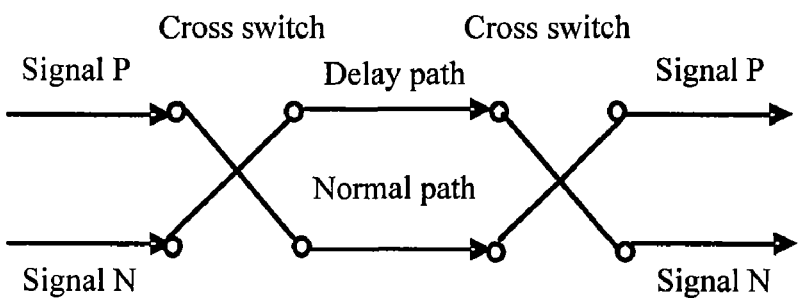

In the procedures above, dependent upon the states, the electrical signal P or N is switched to the delay adjusting apparatus in the delay path by a group of cross switches for delay adjusting, in other words, the selected electrical signal P or N from the differential signals is switched to be inputted to the delay adjusting apparatus according to the transmission delay difference obtained by the phase difference measuring apparatus. Further, the group of cross switches includes at least two cross switches, for example, a first cross switch and a second cross switch, and the electrical signal P or N from the differential signals is switched to be inputted to the delay adjusting apparatus through the control of the first cross switch and the second cross switch. With reference to FIGS. 12A and 12B, the cross switches may be connected in the following two modes.

One of the two connection modes is shown in FIG. 12A, in which the electrical signal P is connected to the delay path and the electrical signal N is connected to the normal path, to increase the delay of the electrical signal P; and The other of the two connection modes is shown in FIG. 12B, in which the electrical signal P is connected to the normal path and the electrical signal N is connected to the delay path, to increase the delay of the electrical signal N.

One branch of delay adjusting apparatus, which is high in cost and complexity, may be reduced with the use of the cross switches. Therefore, by using the cross switches, it is not necessary, to deploy two branches of delay adjusting apparatus, so that the cost and complexity of delay adjustment may be reduced.

Figure 13:
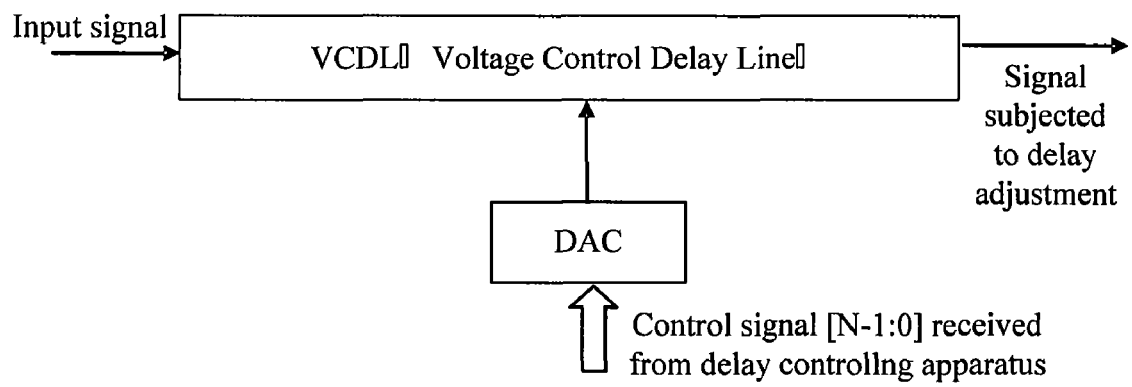
FIG. 13 is a schematic diagram showing structure of a delay adjusting apparatus according to an embodiment of the present invention.

The structure of the delay adjusting apparatus according to the embodiment of the present invention is shown in FIG. 13. The delay adjusting apparatus includes at least one Voltage Control Delay Line (VCDL) unit and a Digital-to-Analog Converter (DAC). The DAC is used to convert the control information outputted by the delay adjustment controlling apparatus into a voltage signal and transfer the voltage signal to the VCDL unit, which adjusts the delay of the inputted signal according to the voltage signal from the DAC and outputs the differential signal after the delay adjustment. The delay adjustment precision of the delay adjusting apparatus with the above structure depends on the delay precision of the VCDL unit and the precision of the DAC. It is noted that no DAC converter needs to be provided in the delay adjusting apparatus if an analog voltage signal is outputted from the delay adjustment controlling apparatus. In addition, in view of requirements for a high delay adjustment precision, a plurality of VCDL units having the respective precisions may be cascaded.

Optionally, in the embodiments of the present invention, to enable the system to converge to the optimal value rapidly, the delay adjustment controlling apparatus may be further provided with a step adjusting function in addition to the basic function so as to implement the automatic adjustment and control of the step. Particularly, in the delay adjusting apparatus, if a digital signal is outputted by the delay adjustment controlling apparatus, the digital signal is converted into an analog voltage signal within the delay adjusting apparatus, and the delay component of the VCDL unit is under the control of the voltage signal to implement the delay adjustment; and if an analog voltage signal is outputted by the delay adjustment controlling apparatus, no digital-to-analog conversion is required and the delay component of the VCDL unit is directly under the control of the analog voltage signal.

If a control signal with N bits of [N−1:0] is outputted from the delay adjusting apparatus, the adjustment step corresponding to the most significant bit is $2^{N-1}$ with respect to a plurality of delay units contained in the VCDL unit. In other words, in the VCDL unit, the delay unit with the maximum adjustment step has an adjustment step of $2^{N-1}$ and the delay unit with the minimum adjustment step has an adjustment step of $2^0=1$. The minimum voltage outputted by the DAC corresponds to the minimum delay component of the VCDL unit (i.e. the minimum adjustment granularity of the VCDL unit), that is, the delay unit having the minimum adjustment step is enabled. Therefore, the input of a lower bit into the DAC may enable the fine adjustment function of the VCDL unit, and the input of a higher bit into the DAC may enable the coarse adjustment function of the VCDL unit. The delay adjustment controlling apparatus may adjust the delay in the order of from a coarse adjustment granularity to a fine adjustment granularity, to implement the optimal delay control manner rapidly.

When the controller, i.e. the delay adjustment controlling apparatus, moves from the second state to the first state or the third state, the most significant bit of the control signal outputted from the controller may be changed, and referred to as the current control bit and set as 1.

When a new state signal is received by the controller, the subsequent processing includes the following.

(1) If the level relationship between new state signals received by the controller is not changed, which means that delay still exists, for example, the electrical signal P arrives earlier than the electrical signal N before and after the delay adjustment, then it is indicated that the delay component set by the control bit does not satisfy the delay adjustment requirements. In this case, the value of the current control bit may be maintained and the current control bit may be updated with the next bit, to increase the delay adjustment step.

(2) If the level relationship between new state signals received by the controller is changed and signals P_FAST and N_FAST are not equal to 0, for example, the electrical signal P arrives earlier than the electrical signal N before the delay adjustment and the electrical signal N arrives earlier than the electrical signal P after the delay adjustment, then it is indicated that the delay component set by the current control bit is excessively large. In this case, the value of the current control bit may be reset as 0 and the current control bit may be updated with the next bit, to decrease the delay adjustment step.

(3) If the level relationship between new state signals received by the controller is changed and both signals P_FAST and N_FAST are equal to 0, that is, no delay exists between the electrical signals P and N, then it is indicated that the current control bit has been set to the optimal coefficient value and the setting of the current control bit may be stopped to keep the current control bit unchanged.

With the above processing, all bit settings are performed to achieve the optimal delay adjustment state, thereby obtaining differential signals with a better quality.

In the above processing, it is noted that if the control bit has been adjusted to the least significant bit, but not both of the signals P_FAST and N_FAST outputted by the delay adjustment controlling apparatus are 0 and the control signal has reached its maximum value, that is, value of each bit of the control signal is 1, then it is indicated that the intra-pair skew has exceeded the maximum adjustable amplitude of the delay adjustment apparatus. In this case, the flag_boundary may be set as 1 and the settings of the current control bit may be stopped.

If the control information outputted by the delay adjustment controlling apparatus is digital, the bus width of the digital information may be determined from the delay adjustment precision request of the system.

A Second Embodiment

Figure 14:
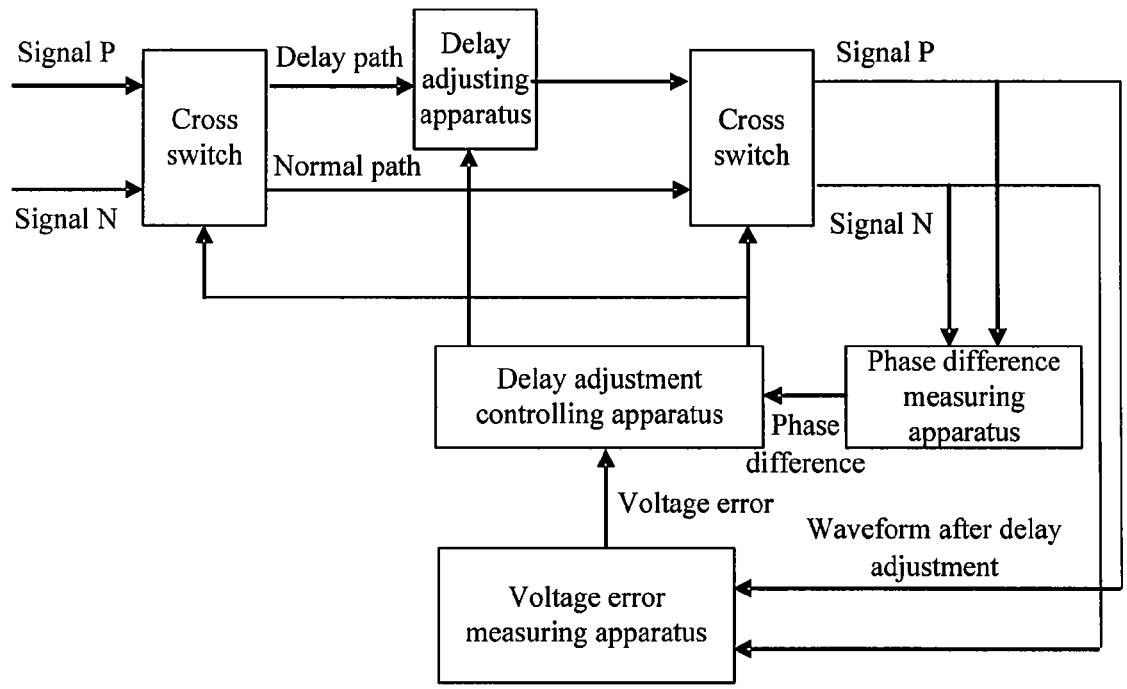
FIG. 14 is a schematic diagram showing structure of a system according to a second embodiment of the present invention.

In the present embodiment, a voltage error measuring apparatus is added on the basis of the first embodiment. The structure of the system according to the second embodiment of the present invention is shown in FIG. 14. The voltage error measuring apparatus is connected to the delay adjustment controlling apparatus to output a voltage error control signal to the delay adjustment controlling apparatus, so that the delay difference between the differential signals may be adjusted precisely.

Figure 15:
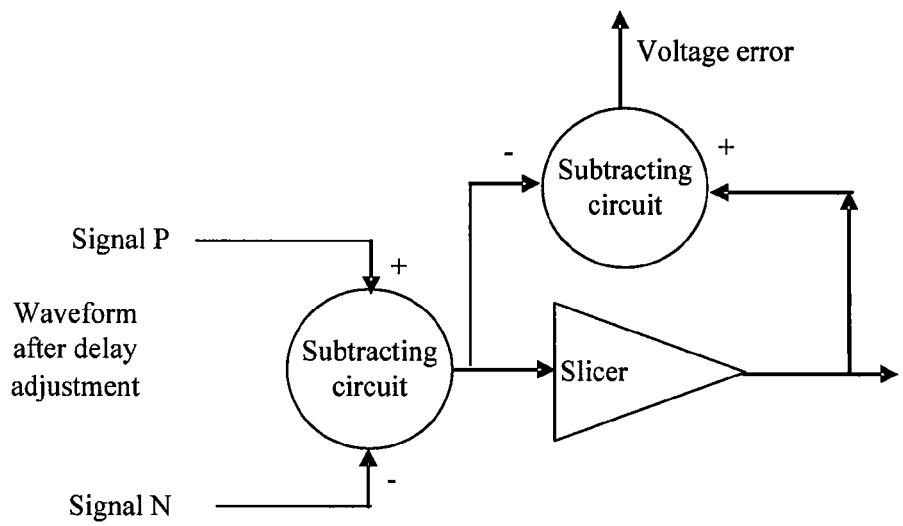
FIG. 15 is a schematic diagram showing structure of a voltage error measuring apparatus according to the second embodiment of the present invention.
Figure 16:
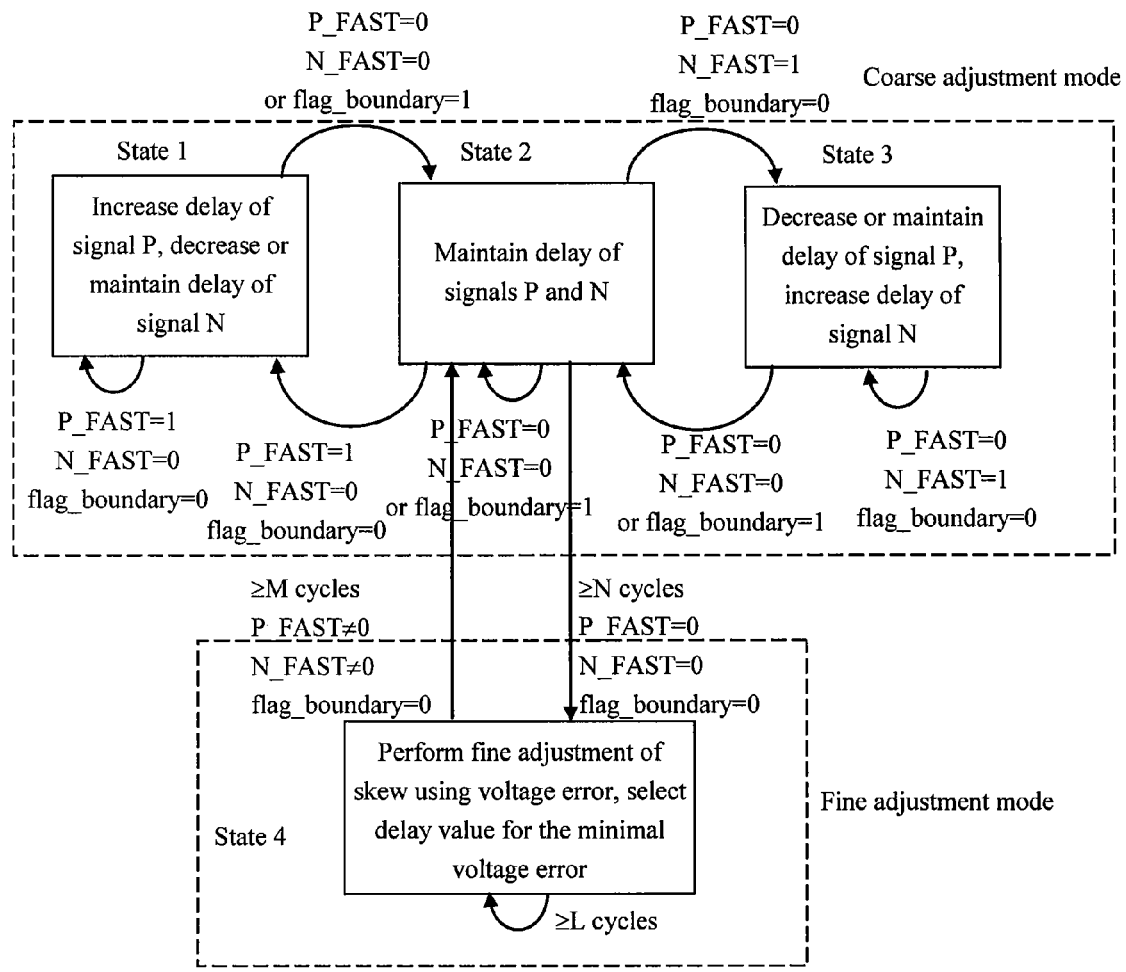
FIG. 16 is a schematic diagram illustrating state transition of a delay adjustment controlling apparatus according to the second embodiment of the present invention.

The illustrative structure of the voltage error measuring apparatus is shown in FIG. 15. The voltage error measuring apparatus includes two subtraction circuits and a slicer. The first subtraction circuit is adapted to perform subtraction between signals subjected to the delay difference adjustment to obtain a differential signal, which is sent to the second subtraction circuit and the slicer respectively. The slicer is adapted to perform judgment on the differential signal to obtain a judged signal, which is sent to the second subtraction circuit which performs subtraction between the differential signal and the judged signal, thereby obtaining the voltage error signal, which is provided for the delay adjustment controlling apparatus.

In the second embodiment, with the added voltage error measuring apparatus, a voltage error control signal is received by the delay adjustment controlling apparatus, enabling the delay adjustment controlling apparatus to provide delay difference adjustment in a fine adjustment mode through the corresponding state machine. Compared with the fine adjustment mode, the delay adjustment according to the first embodiment may be referred to as a coarse adjustment mode. In the second embodiment, upon the reset or power-on of the system, the delay difference adjustment in the coarse adjustment mode is performed, after which the delay difference adjustment in the fine adjustment mode is performed.

The state machine in the fine adjustment mode includes the following.

(1) When the controller is maintained at the second state for N or more periods, where $N \geq 1$, and flag_boundary=0, the controller moves to a fourth state, i.e. state 4, thereby entering the fine adjustment mode.

(2) In the fine adjustment mode, the fine adjustment of the delay component is started and the delay coefficient is adjusted.

Particularly, voltage error signals are received from the voltage error measuring apparatus; subsequently a delay value for the minimal voltage error is selected from the voltage error signals. Alternatively, the delay value may be selected using other predetermined policy of selecting a voltage error, and then the delay value corresponding to the minimal voltage error or the delay value corresponding to the voltage error selected otherwise is set as the fine adjustment coefficient to carry out the delay adjustment.

In other words, in the fine adjustment mode, it is possible to use such a traversal method that the range of fine adjustment of delay is cycled to select the most suitable fine adjustment coefficient for the delay adjustment. The range and step of fine adjustment of delay may be, but is not limited to be determined according to the step and precision of the coarse adjustment.

In the fine adjustment mode, it is noted that the range of fine adjustment of delay may be re-traversed to repeat the above processing (2) after L periods, to adjust the fine adjustment coefficient, so that the delay difference may be adjusted using the most applicable fine adjustment coefficient periodically, where the time period of L periods needs to be longer than or equal to the time for traversing the range of fine adjustment of delay.

Further, in the fourth mode, i.e. the fine adjustment mode, if P_FAST≠0, N_FAST≠0 and flag_boundary=0 for successive M periods, where M≧1, the controller returns to the second state.

As can be seen in the embodiments of the present invention, a phase detecting circuit is used to measure the delay difference in the differential transmission, and the phase detecting circuit may satisfy the requirement for adjusting precisely the intra-pair skew in high speed serial links, thereby improving the precision and reliability of measuring the delay difference. Further, in the embodiments, the delay adjustment controlling apparatus is implemented using the state machine, so that delay difference adjustment with high precision and high reliability may be implemented. In addition, in the embodiments, the voltage difference and the phase difference may be combined to compensate the delay difference with a higher precision, thereby implementing the precise adjustment of the delay difference.

It is appreciated to those skilled in the art that all or a part of the steps in the embodiments may be performed by hardware under the control of a program, which may be stored within a computer-readable storage medium such as a Read-Only Memory (ROM), a hard disk and a Compact Disk (CD).

Exemplary embodiments of the present invention have been described above, but the scope of the invention is not limited to the embodiments. Various modifications and alternatives may be made by those skilled in the art to the invention without departing from the scope of the invention, and all the modifications and alternatives are indented to be within the scope of the invention defined by the appending claims.

The invention claimed is:

1. A system for eliminating intra-pair skew, comprising:
   a phase difference measuring apparatus, adapted to detect phases of differential signals inputted to the phase difference measuring apparatus to obtain a transmission delay difference between the differential signals;
   a delay adjusting apparatus, adapted to perform delay adjustment of the differential signals inputted to the delay adjusting apparatus according to the transmission delay difference obtained by the phase difference measuring apparatus, and output the differential signals after the delay adjustment;
   at least two cross switches, adapted to switch the differential signal which arrives earlier than the other differential signal to the delay adjusting apparatus according to the transmission delay difference obtained by the phase difference measuring apparatus; and
   a delay adjustment controlling apparatus, adapted to receive the transmission delay difference outputted by the phase difference measuring apparatus, and control the cross switches and the delay adjusting apparatus according to the transmission delay difference, to control the delay adjustment of the differential signals;
   wherein the delay adjustment controlling apparatus is implemented using a state machine, and states of the state machine comprise:
   a first state, where an electrical signal P in the differential signals arrives earlier than an electrical signal N in the differential signals, a delay of the electrical signal P is increased and a delay of the electrical signal N is maintained;
   a second state, where the electrical signal P and the electrical signal N in the differential signals arrive simultaneously, the delay of the electrical signal P and the delay of the electrical signal N are maintained; and
   a third state, where the electrical signal N in the differential signals arrives earlier than the electrical signal P in the differential signals, the delay of the electrical signal N is increased and the delay of the electrical signal P is maintained.

2. A system for eliminating intra-pair skew, comprising:
   a phase difference measuring apparatus adapted to detect phases of differential signals inputted to the phase difference measuring apparatus to obtain a transmission delay difference between the differential signals;
   a delay adjusting apparatus, adapted to perform delay adjustment of the differential signals inputted to the delay adjusting apparatus according to the transmission delay difference obtained by the phase difference measuring apparatus, and output the differential signals after the delay adjustment;
   at least two cross switches, adapted to switch the differential signal which arrives earlier than the other differential signal to the delay adjusting apparatus according to the transmission delay difference obtained by the phase difference measuring apparatus;
   a delay adjustment controlling apparatus, adapted to receive the transmission delay difference outputted by the phase difference measuring apparatus, and control the cross switches and the delay adjusting apparatus according to the transmission delay difference, to control the delay adjustment of the differential signals; and
   a voltage error measuring apparatus, adapted to measure an error of the differential signals adjusted by the delay adjusting apparatus, and output the error to the delay adjustment controlling apparatus;
   wherein the delay adjustment controlling apparatus is implemented using the state machine, and states of the state machine comprise:
   a first state, where an electrical signal P in the differential signals arrives earlier than an electrical signal N in the differential signals and a delay adjustment boundary is not reached in the delay adjusting apparatus, a delay of the electrical signal P is increased and a delay of the electrical signal N is maintained;
   a second state, where the electrical signal P and the electrical signal N in the differential signals arrive simultaneously and the delay adjustment boundary is reached in the delay adjusting apparatus, the delay of the electrical signal P and the delay of the electrical signal N are maintained;
   a third state, where the electrical signal N in the differential signals arrives earlier than the electrical signal P in the differential signals and the delay adjustment boundary is not reached in the delay adjusting apparatus, the delay of the electrical signal N is increased and the delay of the electrical signal P is maintained; and
   a fourth state, where the time period when the delay adjustment controlling apparatus is at the second state is more than the predetermined time period and the delay adjustment boundary is not reached in the delay adjusting apparatus, the fine delay adjustment of the differential signals is performed using the error measured by the voltage error measuring apparatus.

3. A communication device comprising:
   a phase difference measuring apparatus, adapted to detect phases of differential signals inputted to the phase difference measuring apparatus to obtain a transmission delay difference between the differential signals;
   a delay adjusting apparatus, adapted to perform delay adjustment of the differential signals inputted to the delay adjusting apparatus according to the transmission delay difference obtained by the phase difference measuring apparatus, and output the differential signals after the delay adjustment;

at least two cross switches, adapted to switch the differential signal which arrives earlier than the other differential signal to the delay adjusting apparatus according to the transmission delay difference obtained by the phase difference measuring apparatus; and a delay adjustment controlling apparatus, adapted to receive the transmission delay difference outputted by the phase difference measuring apparatus, and control the cross switches and the delay adjusting apparatus according to the transmission delay difference, to control the delay adjustment of the differential signals;

wherein the delay adjustment controlling apparatus is implemented using a state machine, and states of the state machine comprise:

a first state, where an electrical signal P in the differential signals arrives earlier than an electrical signal N in the differential signals, a delay of the electrical signal P is increased and a delay of the electrical signal N is maintained;

a second state, where the electrical signal P and the electrical signal N in the differential signals arrive simultaneously, the delay of the electrical signal P and the delay of the electrical signal N are maintained; and a third state, where the electrical signal N in the differential signals arrives earlier than the electrical signal P in the differential signals, the delay of the electrical signal N is increased and the delay of the electrical signal P is maintained.

4. A communication device comprising:

a phase difference measuring apparatus, adapted to detect phases of differential signals inputted to the phase difference measuring apparatus to obtain a transmission delay difference between the differential signals;

a delay adjusting apparatus, adapted to perform delay adjustment of the differential signals inputted to the delay adjusting apparatus according to the transmission delay difference obtained by the phase difference measuring apparatus, and output the differential signals after the delay adjustment;

at least two cross switches, adapted to switch the differential signal which arrives earlier than the other differential signal to the delay adjusting apparatus according to the transmission delay difference obtained by the phase difference measuring apparatus; and a delay adjustment controlling apparatus, adapted to receive the transmission delay difference outputted by the phase difference measuring apparatus, and control the cross switches and the delay adjusting apparatus according to the transmission delay difference, to control the delay adjustment of the differential signals; and a voltage error measuring apparatus, adapted to measure an error of the differential signals adjusted by the delay adjusting apparatus, and output the error to the delay adjustment controlling apparatus;

wherein the delay adjustment controlling apparatus is implemented using a state machine, and states of the state machine comprise:

a first state, where an electrical signal P in the differential signals arrives earlier than an electrical signal N in the differential signals and a delay adjustment boundary is not reached in the delay adjusting apparatus, a delay of the electrical signal P is increased and a delay of the electrical signal N is maintained;

a second state, where the electrical signal P and the electrical signal N in the differential signals arrive simultaneously and the delay adjustment boundary is reached in the delay adjusting apparatus, the delay of the electrical signal P and the delay of the electrical signal N are maintained;

a third state, where the electrical signal N in the differential signals arrives earlier than the electrical signal P in the differential signals and the delay adjustment boundary is not reached in the delay adjusting apparatus, the delay of the electrical signal N is increased and the delay of the electrical signal P is maintained; and a fourth state, where the time period when the delay adjustment controlling apparatus is at the second state is more than the predetermined time period and the delay adjustment boundary is not reached in the delay adjusting apparatus, the fine delay adjustment of the differential signals is performed using the error measured by the voltage error measuring apparatus.

* * * * *